United States Patent [19]
Childers et al.

[11] 3,885,838

[45] May 27, 1975

[54] DRILL BIT BEARINGS

[75] Inventors: John S. Childers; Clayton C. Mandrell, both of Houston, Tex.

[73] Assignee: Reed Tool Company, Houston, Tex.

[22] Filed: June 14, 1973

[21] Appl. No.: 370,170

[52] U.S. Cl. ............................ 308/8.2; 175/337
[51] Int. Cl. ............................ F16c 21/00
[58] Field of Search ....... 308/35, 8.2; 175/337, 359, 175/371, 372

[56] References Cited
UNITED STATES PATENTS

| | | | |
|---|---|---|---|
| 2,104,819 | 1/1938 | Schlumpf et al. | 308/8.2 |
| 3,235,316 | 2/1966 | Whanger | 308/35 |
| 3,620,580 | 11/1971 | Cunningham | 308/8.2 |
| 3,656,764 | 4/1972 | Robinson | 308/8.2 |

*Primary Examiner*—M. Henson Wood, Jr.
*Assistant Examiner*—Robert Saifer

[57] ABSTRACT

A roller drill bit of the type in which a rotatable cutter is supported against radial and thrust loading on a shaft in which thrust and other frictionally engaging bearing surfaces between the cutter and the shaft are established by uncarburized surface portions in either the cutter of the shaft which are otherwise formed of carburized or case hardened steel thereby avoiding heat cracks and spalling of the steel between the bearing surfaces.

9 Claims, 4 Drawing Figures

PATENTED MAY 27 1975 3,885,838

SHEET 2

DRILL BIT BEARINGS

SUMMARY

This invention relates in general to roller drill bits useful in drilling wells or boring holes in earth formations, and in particular to improved friction thrust bearings therefor.

The prior art includes drill bit roller cutters employing anti-friction roller and ball bearings, and structures wherein a cylindrical friction bearing is used in place of the more usual roller bearing. Such bits may have sealed or unsealed cutter bearing structures and employ mud, water or air as a circulating drilling fluid to remove formation cuttings from the bore hole being drilled.

When friction thrust bearings are employed in rock bits, particularly in the drilling operations where air is used as a circulating medium, cracks may be produced in the cutters because of heat build up in such bearings during operations, which may lead to early failure of the drill bit.

The general object of this invention is to provide a new and improved bearing arrangement for a roller cutter drill bit.

Another object is to increase the life of a drill bit by modifying the thrust bearing to increase the operational life thereof.

BRIEF DESCRIPTION OF THE DRAWINGS

The above and other objects and advantages of the invention will become apparent from the following description and the accompanying drawings in which.

DESCRIPTION OF THE PREFERRED EMBODIMENT

Figure 1:
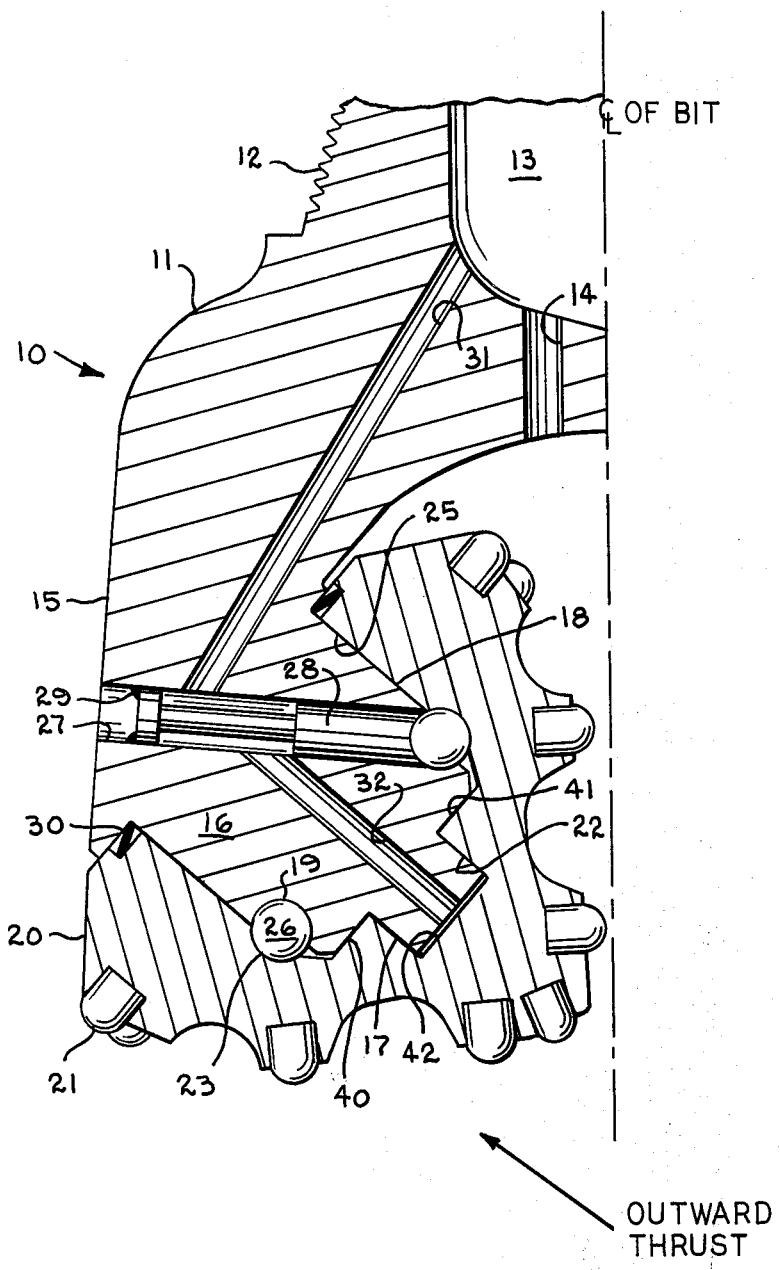
FIG. 1 is a longitudinal section through a roller cutter mounted on one of the bearing shafts.

Referring to FIG. 1, an earth boring drill is shown generally at 10 comprising a head 11 and a threaded shank 12 (partially shown) adapted to be secured to the lower end of a drill string in the usual manner. The head 11 has a chamber 13 and a passageway 14 to receive and discharge drilling fluid pumped downwardly through the drill string.

A leg 15 depends from head 11 and terminates in an inwardly and downwardly extending bearing shaft 16. A bearing or pilot pin 17 is provided on the inner end of the shaft 16. A cylindrical friction bearing 18 is provided on shaft 16 outwardly from pin 17. A ball race 19 is located on the shaft 16 between the pin 17 and the friction bearing 18.

A roller cutter 20 having cutting elements 21, such as tungsten carbide inserts, surrounds the shaft 16 and has a friction bearing 22 engaging the pin 17, and a ball race 23 which is complementary to the race 19 on the shaft 16. The cutter 20 has a friction bearing 25 engaging friction bearing 18 on the shaft 16.

Ball bearings 26 are inserted into the ball races 19 and 23 through bore 27 in the shaft 16, and a ball retaining plug 28 is secured in the bore 27 by welding as shown at 29. A grease seal 30 may be provided between the outer end of the cutter 20 and the shaft 16.

Circulating air may be pumped into the interior of the cutter 20 through passageway 31, around ball retaining plug 28 and through passageway 32 to the end of pin 17 to cool and clean the operating parts, particularly the areas carrying bearing loads.

If other than air or gas is used as a circulating fluid, passageways 31 and 32 may be dispensed with.

The shaft 16 has a radially, outwardly extending annular bearing surface 40 and the interior of the cutter 20 has a radially inwardly extending annular bearing surface 41 adapted to engage the shaft bearing surface 40 to carry outboard thrust loads during drilling operations. The cutter 20 may be spaced axially from the inboard end of the pin 17 as at surface 42 to prevent outboard thrust loads from being carried by these areas if desired. It is believed that when the end of the pin 17 is not loaded axially by the cutter surface 42, the cutter 20 has less tendency to wobble about such pin end thereby improving the bearing life of the drill bit.

The cutter 20 may be made from a carburizing grade of steel such as AISI 4815 or 4820. The shaft may be made of a standard grade of forging steel such as AISI 8620. Both such grades of steel are sufficiently low in carbon so that they may be carburized (sometimes called casehardening) in accordance with carburizing processes well known in the art. Usually the interior cutter surfaces are carburized as well as the surface of the ball race 19 on the shaft 16.

The ball races are usually carburized to provide wear resistance but when severe outboard loads are imposed upon the cutter 20 and through ball bearings 26 to the race 19 on the shaft 16, the surface of the race 19 may spall or chip through fatigue and such chips may circulate and cause damage to the other bearing surfaces and parts of the drill bit. Further spalling may be accelerated because of the rough spalled surfaces with a consequent shortened useful life of the bearings and the drill bit.

In the drilling of blast holes for mining, air is usually used as a circulating fluid so that when surface 41 of the cutter engages surface 40 of the shaft under outboard load conditions on the cutter 20, the surfaces are heated to high temperatures by friction and the circulating air usually is not adequate to cool properly these surfaces so that heat cracks may form in the cutter which cracks may lead to early failure of the cutter.

In order to alleviate such spalling and cracking and to improve the useful life of the drill bit, we copper plate or otherwise stop off surface 41 to inhibit difussion of carbon in areas so stopped-off, and if desired, surfaces 17 and 42, so that these surfaces are not carburized during the carburizing cycle, and we also design the bearing assembly to result in initial or early engagement of the cutter bearing surface 41 with the shaft bearing surface 40 when the cutter 20 is subjected to outward thrust loads.

Also if desired an appreciable portion of the outboard surface of the shaft ball race 19 may be uncarburized so that it may not chip under outboard loads imposed by the balls 26.

Figure 2:
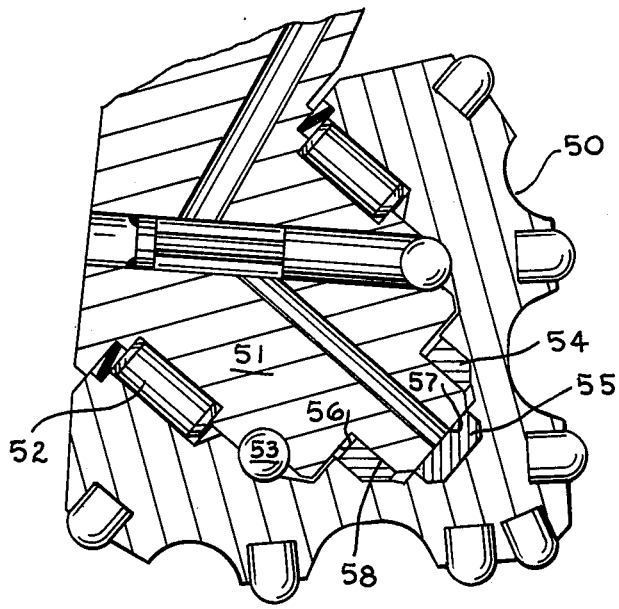
FIG. 2 is a longitudinal section through a roller cutter mounted on a shaft and is illustrative of the prior art.

FIG. 2 illustrates the prior art showing a cutter assembly comprising a cutter 50, a bearing shaft 51, employing the usual roller bearings 52 and the ball bearings 53 plus a pin bushing 54 and a thrust button 55. The thrust button 55 may be made of a tool steel, and is pressed into place. The pin bushing 54 may be made of a carburizing grade of stainless steel, and it also is pressed into place. As can be seen, the cutter shell is correspondingly reduced in thickness between the bushing 54, thrust button 55 and the exterior surface of the cutter 50 which tends to weaken the cutter in these areas.

Also space is usually provided between the outboard end of the bushing 54 and the surface 56 of the shaft 51, while no space is usually provided between the thrust button 55 and the end 57 of the pin 58. In such prior art arrangements, there is usually only limited, if any, contact by the cutter with the shaft surface 56, when outward thrust loads are imposed upon the cutter 50, and such contact as may occur may involve carburized surfaces which may crack under high thrust loads and friction heat.

Figure 3:
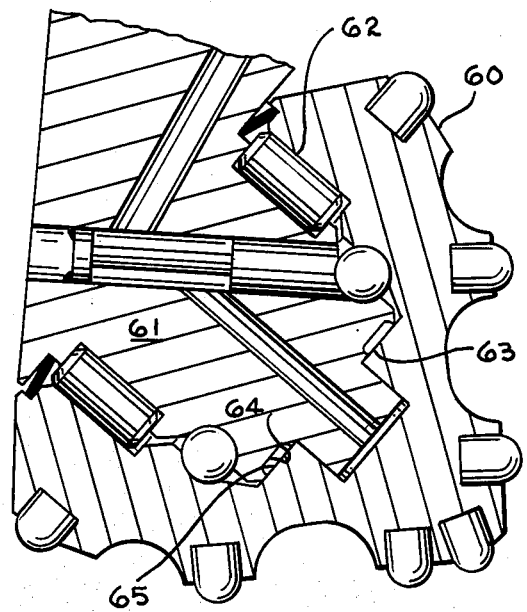
FIG. 3 is a view similar to FIG. 1 except that roller bearings are employed in combination with ball bearings.
Figure 4:
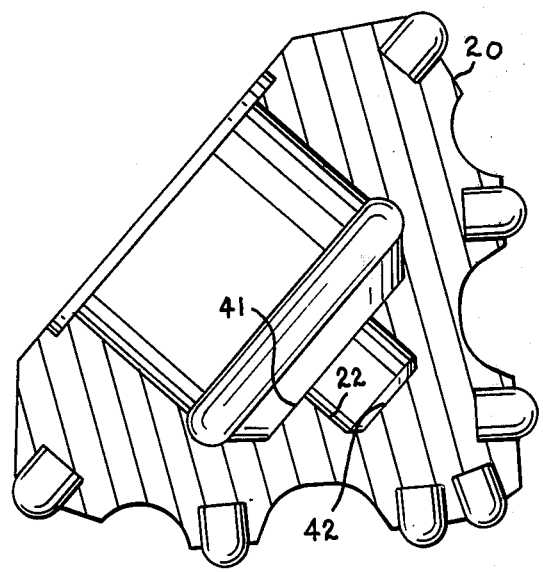
FIG. 4 is a longitudinal section taken through a cutter of the type shown in FIG. 1.

FIG. 3 is a view similar to FIG. 1 but employing a cutter 60 on bearing shaft 61 wherein the cutter and shaft have complementary roller raceways into which are disposed roller bearings 62. A radially extending bearing surface 63 may have a wear resistant inlay 64 of suitable bearing metal to alleviate wear when it is engaged by the radially extending surface 65 of the cutter 60.

Thus the invention provides an improved drill bit bearing which is economical to manufacture and affords a structure which will alleviate friction heat cracks in the cutter and will enable the cutter bearing to take more outboard thrust loads without ball race failure.

The foregoing disclosure and description of the invention are illustrative and explanatory thereof, and various changes in the size, shape and materials as well as in the arrangement and in the details of the illustrated construction, may be made within the scope of the appended claims without departing from the spirit of the invention.

What is claimed is:

1. A drill bit including:
   a bearing shaft having an inboard end,
   a rotatable cutter of carburizing steel mounted on the inboard end of said shaft, at least the exterior surface of said cutter and portions of the interior surfaces thereof being carburized,
   the shaft having a ball raceway,
   the cutter having a ball raceway registering with the ball raceway in said shaft,
   ball bearings in said raceways serving to rotatably lock the cutter on said shaft,
   the said shaft having a radially outwardly extending annular bearing surface inboard of said ball raceway,
   the interior of the cutter having a radially inwardly extending annular bearing surface registering with and adapted to engage the radial bearing surface on said shaft to carry outboard thrust loads imposed on the cutter,
   at least the radial cutter bearing surface being uniformly uncarburized throughout at least a substantial portion thereof to alleviate frictional heat cracking thereof during the drilling operation.

2. A drill bit according to claim 1 wherein means are provided to circulate fluid into the interior of said cutter.

3. A drill bit according to claim 1 wherein the inner end of the bearing shaft has a cylindrical pilot pin and the cutter has a cylindrical portion in bearing engagement with said pilot pin, the cylindrical bearing portion of said cutter also being substantially uncarburized.

4. A drill bit according to claim 1 wherein said bearing shaft and cutter include roller bearing raceways and roller bearings in said raceways.

5. A drill bit according to claim 1 wherein the radially extending shaft bearing surface has an inlay of suitable bearing material.

6. A drill bit according to claim 1 wherein seal means are provided between the cutter and the bearing shaft.

7. A drill bit according to claim 1 wherein said shaft is downwardly and inwardly inclined toward the inboard end thereof, the outwardly and downwardly facing side of said shaft establishing an outboard surface thereon and wherein an appreciable portion of the outboard surface of the shaft ball race is uncarburized.

8. A drill bit bearing including:
   a bearing shaft of carburizing steel extending downwardly and inwardly toward the rotational axis of a rotary head carrying said bearing shaft,
   a roller cutter also of carburizing steel on said shaft,
   the shaft and cutter each having a friction bearing surface arranged to carry outboard thrust loads imposed on the cutter,
   the surfaces of said shaft and said cutter being carburized except at least one of said friction bearing surfaces being uniformly uncarburized throughout at least a substantial portion thereof to alleviate frictional heat cracking thereof during drilling operation.

9. A drill bit bearing according to claim 8 wherein means are provided to circulate fluid into the interior of said cutter.

* * * * *